United States Patent [19]

Tutsek et al.

[11] 4,049,464

[45] Sept. 20, 1977

[54] METHOD OF PRODUCING LOW-CARBON, WHITE HUSK ASH

[75] Inventors: Alexander Tutsek, Gottingen; Peter Bartha, Bovenden, both of Germany

[73] Assignee: Refratechnik GmbH, Gottingen, Germany

[21] Appl. No.: 720,089

[22] Filed: Sept. 2, 1976

Related U.S. Application Data

[63] Continuation of Ser. No. 562,098, March 26, 1975, abandoned.

[30] Foreign Application Priority Data

Apr. 4, 1974 Germany .............................. 2416291

[51] Int. Cl.$^2$ ............................................. C04B 31/00
[52] U.S. Cl. ................................ 106/288 B; 106/309; 423/335
[58] Field of Search ............... 106/288 B, 288 Q, 309; 423/335

[56] References Cited

U.S. PATENT DOCUMENTS

| 1,528,371 | 3/1925 | Gambel | 423/335 |
| 3,125,043 | 3/1964 | Gravel | 110/28 |

FOREIGN PATENT DOCUMENTS

| 2,070,383 | 9/1971 | France | 106/288 B |
| 697,474 | 9/1953 | United Kingdom | 106/69 |

Primary Examiner—Patrick P. Garvin
Assistant Examiner—John P. Sheehan

[57] ABSTRACT

Low carbon, white husk ash suitable for use in manufacturing building materials, more particularly refractory building materials are prepared by first removing volatile constituents by heating the husks, normally rice husks but alternatively, for example, wheat, oats or barley husks, to a first relatively low temperature below the ignition point of the husks. Fixed carbon is then oxidized in the presence of a reagent by heating the husks to a second temperature above the separation temperature but below the crystallization temperature of the SiO$_2$ in the husks, following by a heat treatment at a third temperature above the crystallization temperature of the SiO$_2$, to produce a uniform SiO$_2$ crystal structure.

7 Claims, No Drawings

METHOD OF PRODUCING LOW-CARBON, WHITE HUSK ASH

This is a continuation, of application Ser. No. 562,098, filed Mar. 26, 1975 now abandoned.

The invention relates to a method of producing low-carbon, white husks suitable for use in the manufacture of building materials, more particularly refractory building materials.

Rice is a basic food in Asia, more particularly India and Japan, and substantial amounts are also cultivated in various countries in America and Europe. The present world rice production of about 400 million tons per year will probably increase in the future, owing to the great increase in population, paticularly in Asian countries. When rice grains are husked, the husks make up about 14 to 35%, depending on the variety of rice; since the husks have a low bulk weight of about 100 kg/m$^3$, they take up 560 to 1400 million m$^3$.

Chemical analysis of rice husks shows the following typical composition (referred to substance free from loss on ignition):

| | |
|---|---|
| Water | 9% |
| Protein | 3.5% |
| Fats | 0.5% |
| Cellulose | 30 to 42% |
| Pentosan | 14 to 18% |
| Mineral ash | 14 to 30% |

The composition of the mineral ash is normally within the following limits:

| | |
|---|---|
| $SiO_2$ | 92 to 97% |
| $Al_2O_3$ | 0.75 to 3% |
| $Fe_2O_3$ | 0.17 to 2% |
| CaO | 0.36 to 3% |
| MgO | 0.32 to 1.5% |

In addition, up to 30% carbon is found, depending on the degree and nature of combustion of the organic constituents before analysis.

In view of the composition of rice husks, a number of suggestions have been made for large-scale use thereof in agriculture or industry. These suggestions relate to direct use, with or without comminution; chemical decomposition of rice husks on an industrial scale to obtain organic chemical basic materials; combustion for obtaining heat, and use of the mineral ash residues. The possible applications include; the use of rice husks as fodder, for loosening up the earth, for pressing fruit or the like, for producing building materials such as slabs or the like, or use as fillers, packing materials or oil-absorbing substances. In industrial technology, rice husks are a basic material for obtaining furfurol for hydrolysis of wood, and for obtaining acetic acid and other organic basis materials. Rice husks are also used as abrasives, heat-transfer media for steam and electricity generation, and for producing ferrosilicon, silicon carbide, silicon nitride, lignin and nitrogen-lignin compounds, sodium silicate, silicon tetrachloride and the like.

More particularly, rice husk ash is used in the glass industry, the ceramics industry, the cement industry and especially in the refractory-materials industry, since it has the properties of a porous silicic-acid raw material. As already mentioned, about 92 to 97% of rice husk ash consists of $SiO_2$ and, therefore, has a melting-point above 1600° C. It is, therefore, particularly suitable, as a silicic-acid carrier, for use as a raw material for manufacturing heat-insulating, refractory and heat-resistant building materials such as refractory, chemically bonded or burnt bricks and materials, and for manufacturing light building materials bonded with hydrated calcium silicate (tobermorite synthesis). The aforementioned materials have to be produced from ashes which have a defined carbon content and also have a given structure. In the case, for example, of rice husk ash suitable for tobermorite synthesis, the silicic acid content must be in an "amorphous", vitreous, and therefore very reactive, form. For refractory purposes, on the other hand, the silicic acid should occur in crystalline form, for example as quartz, cristobalite or tridymite, so as to have the required dimensional stability at high temperatures.

It has been found that refractory building materials or the like can be prepared only from white rice-husk ash, that is ash which is substantially free from carbon or contains only a small amount of carbon, since black rice-husk ash (that is ash containing a high proportion of carbon) is water-repellent owing to the carbon residue, so that the ash particles are insufficiently wetted with aqueous binder solutions and it is more difficult to bond the bricks and obtain a mechanically strong structure. The presence of carbon likewise interferes with tobermorite synthesis, since it prevents, of at least adversely affects, the formation of tobermite. When ceramic products are produced, an undefined carbon content may result in undesirable reduction phenomena in the pots. A controlled carbon content and a definite structure are also required in other applications of rice husk ash, for example when used as fillers, filter materials or the like, since the colour of the ash is then uniform.

It has been found that white, low-carbon rice husk ash is obtained when the husks are charred or "roasted" in open piles. In countries where rice is grown, this process is usually performed in the open air. The husks are ignited at a certain point and then heat up, and smoulder from the centre outwards. This process, which produces hardly any flames, lasts about 3 to 6 months. Aromatic vapours and gases are produced, and give off a very unpleasant smell over a wide area. Furthermore, particulars of ash having a high silicic-acid content are blown round the neighbourhood and are liable to produce silicosis in men and animals. The burnt-out heap of rice husks, consisting of ash, does not have any uniform colour, chemical composition, crystal structure or degree of crystallisation, since "roasting" occurs under uncontrolled conditions, so that the colour of a pile of ash varies between pink, white, grey and black. It is difficult to separate the individual constituents, which differ in chemical, mineralogical and physical respects, consequently ash of the aforementioned kind does not satisfy the conditions which are particularly necessary for use as a constituent of refractory building materials. Another point is that the specific weight of "amorphic" and crystalline ash is non-uniform — for example 2.12 for amorphous rice husk ash and 2.28 for crystalline ash containing cristobalite. The quality of the finished building material, however, depends on a uniform crystal structure, on both the crystal modification and the degree of crystallinity of the $SiO_2$ in the ash, since these factors have an effect particularly on the coefficient of thermal expansion.

Owing to the high calorific value of rice husks (3430 to 3995 kcal/kg), the "roasting" of rice husks in open piles occurs automatically, but the process is inefficient and also, as already mentioned, takes about 3 to 6 months and can, therefore, not be used on a large industrial scale for producing white rice husk ash (more particularly because of the aforementioned pollution problem). It is particularly noteworthy that the aforementioned process cannot yield ash having a uniform crystal structure and a uniform low carbon content.

On the other hand, when the rice husks are burnt in industrial plants for obtaining heat (for example to produce steam), the ash occurs in the form of black residues having a high carbon content, usually between 10 and 25%. For the reasons given, however, ash having a carbon content as high as this is unsuitable for many applications, more particularly for the manufacture of refractory materials. In the present case, the slowness of carbon to react is probably due to the fact that, after the silicic acid has crystallised, the carbon is not sufficiently accessible for combination with oxygen.

No success has to date been obtained in attempts to control the combustion of rice husks so as to produce a low-carbon or carbon-free ash. On the other hand, it has been shown that subsequent roasting of black-rice husk ash is uneconomic, since the carbon is in very inert form. Table 4 hereinafter shows that no white ash is obtained even at high temperatures such as 1000° C. and even after 1½ hours treatment.

There is no known process, therefore, which operates under conditions at which the organic constituents are converted into energy or separable decomposition products and in which a low-carbon white ash is obtained for the manufacture of building materials.

An object of the invention, therefore, is to provide a large-scale industrial method of producing white, low-carbon rice husk ash, the process being efficient and economic and adapted to produce homogeneous, white rice husk ash having a uniform low carbon content and a well-defined $SiO_2$ crystal modification and a homogeneous degree of $SiO_2$ crystallisation.

To this end, in the method of the present invention, volatile constituents are first removed by heating the husks, in the absence of air, to a first, relatively low temperature below the ignition point of the husks, after which the fixed carbon in the husks is oxidised in the presence of a reagent by heating the husks to a second temperature above the separation temperature but below the crystallisation temperature of the $SiO_2$ in the husks, after which the resulting husk ash is heat-treated at a third temperature above the crystallisation temperature of the $SiO_2$, to produce a uniform $SiO_2$ crystal structure. The husks are preferably rice husks.

In a preferred embodiment of the method, the volatile constituents are separated at a temperature in the range of from 200 to 450° C, and the fixed carbon is oxidised at a temperature between 450 and 700° C. According to another preferred feature, the rice husks are first brought to a separation temperature in the range of from 200° to 250° C. at a heating rate of from 10° to 40° C/min, starting at a feed temperature of less than 100° C., and are subsequently heated at the same rate and in the presence of the reagent to an oxidation temperature in the range of from 450° to 550° C., after which the resulting rice husk ash is heated at the same rate to a treatment temperature between 700 and 800° C.

Preferably, the rate of heating up is 25° C/min. According to another embodiment, the reagent supplied for oxidising the fixed carbon in the second process step is combustion-supporting air having an excess air coefficient of $n = 4.0$ to 6.0, that is an amount four to six times that required for a complete combustion or reaction. Alternatively, the reagent supplied is water-vapour.

In other words, the inventive concept of the method of the invention is as follows: The rice husks are ashed in a three-step process; in a first step, the husks are separated, in the absence of air, from volatile constituents, after which the fixed carbon is oxidised at a higher temperature, which is followed by heat-treatment at a still higher temperature in order to adjust the degree of crystallisation and the $SiO_2$ crystal modification. The combustible gases produced during the separation of volatile constituents and the gasification of the fixed carbon are subsequently burnt; the resulting energy is sufficient for the entire process and under particularly efficient conditions, can provide additional energy.

The method according to the invention can be used, under industrial conditions, to manufacture white rice husk ash having a low carbon content and a defined composition and structure, the separated organic constituents being volatilised and used for heating. The heat obtained from the organic constituents of the husks can be used for the ashing process itself and/or (as already mentioned) for other purposes. Alternatively, of course, the organic thermal-decomposition products of the husks can be further processed in known manner and synthesised to furfurol, wood vinegar, methanol or the like; alternatively, of course, rice husks can be ashed according to the invention after being treated in a known process step for obtaining furfurol.

The method according to the invention, therefore, is adapted for efficient, large-scale manufacture of white rice husk ash having a definite composition and structure, of the kind which cannot be obtained by subsequent roasting of black ash from conventional combustion processes, since such processes are insufficiently economic owing to the additional energy and time required. The invention is based on the surprising discovery that an optimum low carbon content is not obtained by burning the rice husks at a high temperature; instead, a number of tests at between 100° to 1000° C. have yielded the unexpected result that optimum white ash is obtained at temperatures between 450° and 550° C., whereas the ash obtained at lower or higher oxidation temperatures is normally black or grey and unserviceable. This finding applies both to continuous heating and to temperature shock treatment in a given temperature range.

According to another feature of the present invention, the husks are normally comminuted before heat treatment, to increase the bulk weight. The resulting increase in bulk weight (to about 0.5 t/m³) considerably increases the energy yield and the throughput of the process according to the invention.

Other features and advantages of the invention will be clear from the claims and the following description, in which the invention is illustrated by an example and by experimental results.

EXAMPLE

Rice husks, untreated or pretreated to obtain furfurol, have the composition and properties given in Table 1.

Table 1

| Designation | Rice husks from Italy | Rice husks from Italy used in the furfurol process |
|---|---|---|
| Ash | 14.4% | 20.7% |
| Combustible constituents | 85.6% | 79.3% |
| Volatile constituents | 69.7% | 53.9% |
| Lower calorific value | 3430 kcal/kg | 3995 kcal/kg |
| Ignition point (air) | ~250° C | ~250° C |
| C | 39.6% | 43.0% |
| H | 5.4% | 4.5% |
| S | traces | — |
| N | 0.32% | 0.44% |
| O | 40.28% | 31.36% |

Differential thermoanalysis (DTA) and differential thermogravimetry (DTG) in a nitrogen atmosphere and in the presence of air showed that the decomposition reactions proceed as shown in Table 2.

Table 2

| (° C) | Rice husks $N_2$ atmosphere | Rice husks no exclusion of air |
|---|---|---|
| 100 | 100° C endothermic reaction: decomposition of pentosan and formation of volatile constituents and tar | |
| 200 | | 230–500° C exothermic reaction: Decomposition of cellulose and oxidation of the free carbon |
| 300 | 270° exothermic reaction: decomposition of cellulose and formation of volatile constituents (CO) | |
| 400 | 360° C exothermic reaction decomposition of lignin and formation of volatile constituents (CO,$CH_4$) | |
| 500 | | |
| 600 | | |
| 700 | 700–800° C exothermic reaction: crystallisation of $SiO_2$ and fixed C residue | 700–800° C exothermic reaction: crystallisation of $SiO_2$ |
| 800 | Black rice husk ash | White rice husk ash |

The proceding Table 2 shows that the thermal separation of the volatile constituents reaches a maximum at approximately 360° C. and is substantially complete at approximately 450° C. In a nitrogen atmosphere, the fixed carbon content remains in the ash, whereas in the presence of air it can be removed by oxidation under optimum conditions at 500° to 550° C, that is precisely by the method according to the invention.

Structural research on the silicic-acid content of the husks has shown that the acid is mainly in the form of very imperfect cristobalite, apparently with mainly oxidative bonding in the "amorphous" state. Depending on the temperature used, the cristobalite either remains amorphous in X-rays or crystallises out. If mineralising agents are not added, crystallisation begins at 700° C, with marked vibration of the ash. If mineralising agents are added, crystallisation begins at 300° C. Experiments have shown that alkali-metal halides (such as NaF, NaCl and KCl) are particularly effective mineralising agents. It is sufficient, for example, to wet the husks with 0.2 N aqueous NaCl solution. It has also been found that crystallisation of the silicic acid can be delayed if the husks are wetted with HCl before thermal decomposition. Very reactive white rice husk ash can be obtained in this manner at 700° C. It has also been found that the removal of fixed carbon from the ash can be accelerated by adding mineralising agents such as NaF, NaCl or KCl.

Systemmatic ashing tests on a semi-industrial scale in the presence of stagnant air have shown that a white ash is obtained in the temperature range between approximately 450° and 550° C., as shown in the following Table 3.

Table 3

| Processing temperature | Weight loss | Colour of ash residue |
|---|---|---|
| 300° C | 29.8% | Black |
| 400° C | 66.8% | Grey |
| 500° C | 77.1% | White |
| 600° C | 74.7% | Grey |
| 700° C | 69.4% | Black |
| 800° C | 73.5% | Black |
| 1000° C | 75.8% | Black |

Table 3: Loss of weight during thermal decomposition of rice husks, and colour of ash during spontaneous heating to the temperature indicated. Duration: 1 hour. Stagnant air.

Table 3 also shows that the organic constituents of the husks are not decomposed to an adequate extent if the temperature is below 450° to 550° C. Above 550° C, heating-up is spontaneous and the ash is unsuitable (black, carbon-containing). If the temperature is increased far above 1000° C. (this was also tried experimentally), there is no improvement in the rate of decomposition and the purity of the inorganic end product, compared with decomposition in the aforementioned region of 450° to 550° C. Table 3 shows that the greatest loss of weight occurs during spontaneous heating at approximately 500° C. The end product is white, whereas the quality of the ash progressively decreases above and below 500° C.

With regard to the rate at which husks must be brought to the temperature of 450 to 550° C. the optimum rate was found to be 25° C/min, as shown from Table 4 hereinafter:

Table 4

| Processing temperature | Weight loss | Colour of ash residue |
|---|---|---|
| 20 – 300° C | 37.1% | Black |
| 20 – 400° C | 72.1% | Grey |
| 20 – 500° C | 77.5% | White |
| 20 – 600° C | 76.9% | White |
| 20 – 700° C | 78.0% | White |
| 20 – 800° C | 76.1% | White |
| 20 – 1000° C | 78.6% | White |

Table 4: Loss of weight during continuous heating of rice husks to the temperature indicated. 25° C/Min. stagnant air.

Table 4 shows that white ash is obtained at 500° C onwards, after gradual heating at 25° C/min from room temperature. It has been shown that 10° C/min and 40° C/min can normally be regarded as the upper and lower limit for the rate of heating at which ash having adequate "whiteness" (C <2%) can be obtained.

Table 5 hereinafter shows the progressive loss of weight at the optimum temperature of 500° C:

Table 5

| Time | Weight loss | Colour |
|---|---|---|
| 0 min | 0% | gold-yellow |
| 1 min | 41.7% | black |
| 3 min | 45.6% | black |
| 5 min | 49.2% | black |
| 10 min | 56.0% | black |
| 30 min | 76.1% | grey |
| 60 min | 78.8% | white |

Table 5: Weight loss during thermal decomposition of rice husks after spontaneous heating to 500° C, in dependence on time. Stagnant air.

As Table 5 shows, 41.7% of combustible constituents have been removed from the husks after 1 minute. After 10 to 30 minutes, all the volatile constituents have been driven off. At the same time, the fixed carbon constituent begins to vaporise and is substantially removed within 60 minutes.

Table 6 hereinafter shows the weight loss during subsequent oxidation of black rice husk ash obtained by high-temperature combustion:

Table 6

| Temperature | Weight loss/min | | | | Colour |
|---|---|---|---|---|---|
| | 25 | 60 | 120 | 180 | |
| 300° C | 2.4% | 2.61% | 2.6% | 2.9% | Black |
| 400° C | 8.93% | 8.98% | 9.05% | 9.06% | Black |
| 500° C | 24.26% | 24.47% | 24.68% | 24.90% | Grey |
| 600° C | 24.60% | 24.87% | 24.95% | 24.96% | Grey |
| 700° C | 24.00% | 24.01% | 24.05% | 24.07% | Grey |
| 800° C | 24.41% | 24.50% | 24.55% | 24.54% | Grey |
| 1000° C | 24.45% | 24.83% | 24.81% | 24.90% | Grey |

Table 6: Weight loss during subsequent oxidation of black rice husk ash obtained by high-temperature combustion.

Table 6 shows that the carbon in black ash can likewise be removed at 500° C. by oxidation. No advantage is gained by increasing the temperature or the time.

Our discussion of the results illustrated in Tables 3 to 6 shows that white rice husk ash having the desired low carbon content (C <2% or, at least, <3%) and a given structure can be obtained if the volatile constituents are separated according to the invention at temperatures preferably below 450° C, whereas the fixed carbon is vaporised, preferably between 450° and 550° C, by oxidation, reaction with water gas or the like.

If required, additives such as NaCl should be added so as to accelerate the removal of fixed carbon in gaseous form during the second process step. The distillation products obtained by the method according to the invention can be synthesised in known manner to obtain heat or organic raw materials. In order to obtain a white ash containing silicic acid in a reactive state (tobermorite synthesis), the maximum process temperature must remain below the crystallisation temperature of the $SiO_2$ in the rice husks, that is below 700° C. In this case, crystallisation-inhibiting admixtures such as HCl can be used if required.

A white ash in which the silicic acid has crystallised, as is particularly advantageous in the use of rice husk ash for manufacturing refractory building materials, can be obtained according to the invention by heat-treating the ash in the range preferably from 700° to 800° C after the organic constituents have been separated. Crystallisation occurs at temperatures between 300° and 800° C, depending on whether mineralising agents such as NaCl, NaF or KCl are added or absent.

The method according to the invention can take place in one or more steps in known devices such as rotary furnaces, blast furnaces, retort furnaces and sintering plants. The inventive concept which relates more particularly to the manufacture of rice husk ash suitable for use in refractory materials, can of course be modified by the skilled addessee from the form in which it has been described and is defined in the claims.

Of course, the process according to the invention can also be applied to the treatment of other suitable husks, for example, wheat, oats or barley.

The features of the invention disclosed in the preceding description and the following claims can be used either singly or in any combinations for putting into practice the various embodiments of the invention.

We claim:

1. In a method of producing low-carbon, white rice husk ash suitable for the production of building materials, and more particularly refractory building materials, in which method, for purposes of removing volatile constituents and for purposes of transforming the fixed carbon into a gaseous compound, the rice husks are heated to a temperature below the crystallization temperature of the $SiO_2$ of the rice husks, whereupon the resultant husk ash is heat-treated at a temperature above the crystallization temperature of the $SiO_2$ for the purposes of obtaining a uniform $SiO_2$ crystal structure, the improvement comprising: the first step of heating the rice husks to a first relatively low separation temperature within the range of from 200° to 450° C. in the absence of air, exclusively for separating the volatile constituents that are capable of after-burning; subsequently the second step of heating the rice husks free of volatile constituents to a gasification temperature in the range of from 450° to 550° C. while feeding an oxidizing agent thereto for transforming the fixed carbon into a gaseous phase prior to heat treatment; and the third step of subsequently heating the thus obtained rice husk ash to a heat treatment temperature in the range of from 700° to 800° C.

2. The method of claim 1, in which the husks are first brought to a separation temperature of from 200° to 350° C. at a heating rate of from 10° to 40° C/min, from a feed temperature of less than 100° C., and are subsequently heated at the same rate and in the presence of the oxidizing agent to the gasification temperature in the range of from 450° to 550°C., after which the resulting husk ash is heated at the same rate to the treatment temperature between 700 to 800° C.

3. The method of claim 2, in which the rate of heating is 25° C/min.

4. The method of claim 1, in which the oxidizing agent supplied for oxidising the fixed carbon in the second step is combustion-supporting air having an air coefficient of $n = 4.0$ to 6.0.

5. The method of claim 4, in which the oxidizing agent supplied is water-vapour.

6. The method of claim 1, in which HGl is added so as to inhibit the crystallization of $SiO_2$ in the gasification step.

7. The method of claim 1, in which husks are comminuted in order to increase the bulk weight thereof before heat-treatment.

* * * * *

UNITED STATES PATENT AND TRADEMARK OFFICE
CERTIFICATE OF CORRECTION

PATENT NO. : 4,049,464
DATED : September 20, 1977
INVENTOR(S) : ALEXANDER TUTSEK, et al It is certified that error appears in the above-identified patent and that said Letters Patent are hereby corrected as shown below:

Column 8, line 50, replace HG1 by -- HCl --.

Signed and Sealed this

Thirty-first Day of January 1978

[SEAL]

Attest:

RUTH C. MASON
Attesting Officer

LUTRELLE F. PARKER
Acting Commissioner of Patents and Trademarks